Sept. 14, 1926.  H. KOEHLER  1,599,568

EDUCATIONAL CARD SYSTEM

Filed June 26, 1924

INVENTOR
H. Koehler
BY E. J. Fetherstonhaugh
ATTY.

Patented Sept. 14, 1926.

1,599,568

UNITED STATES PATENT OFFICE.

HELMA KOEHLER, OF TORONTO, ONTARIO, CANADA.

EDUCATIONAL CARD SYSTEM.

Application filed June 26, 1924. Serial No. 722,513.

The invention relates to an educational card system and the objects of the invention are to make impressions on the minds of the younger people by visual signs and figures that will prove useful in their regular exercises and clearly demonstrate to them the significance of the actual sign and how to apply the same, and coincidently with this demonstrate to occupy and develop the minds by working these cards into a conventional game of possession by tricks, either by their number or by combinations of cards found therein; to economically carry out the education of children in an effective manner and by kindergarten methods, especially in that which appeals to the eye, will have a corresponding influence in memorizing useful information, and generally to furnish to the public at a moderate cost amusing and instructive methods of making lasting impressions for the purposes of education; it also consists essentially in setting a value for competitive purposes on certain cards in groups illustrating in novel characters, or groups of characters and symbols the lesson to be learned, and in giving the cards forming the lesson in each set predetermined values for competitive purposes.

In the drawings, Figures 1, 2 and 3 illustrate a set of cards representing the numeral 1 and in the game having different values.

Figure 1:
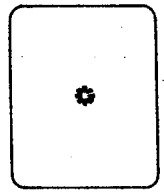
Figure 2:
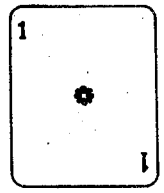
Figure 3:
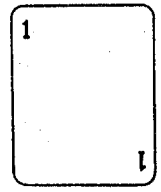
Figure 4:
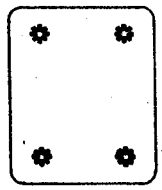
Figures 4, 5 and 6 show a set of cards for the numeral 4, having their individual values.
Figure 5:
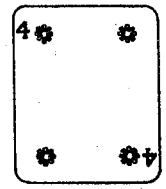
Figure 6:
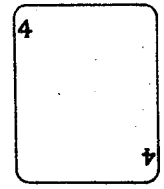
Figure 7:
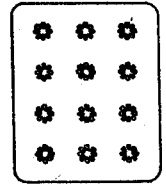
Figures 7, 8 and 9 are another set representing the numeral 12.
Figure 8:
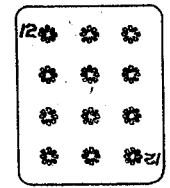
Figure 9:
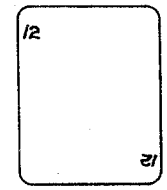
Figure 10:
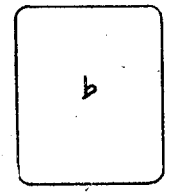
Figures 10, 11 and 12 are views illustrating another adaptation of the system as well as Figures 13, 14 and 15, both of these card sets applying musical notes and signs.
Figure 11:
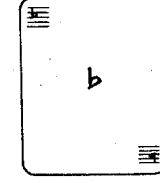
Figure 12:
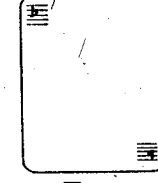

This system of education by a particular kindergarten method is carried out by establishing the card values according to rules that can readily be laid down from time to time, but generally the cards in Figures 1–9, the values can be regulated by the number of spots, as the several sets will run up from 1 to 12 or more consecutively, only three of these being illustrated.

In each set, however, the cards will have an arbitrary value, as for instance, the plain card with the numerals in the corners may be called a trump and will capture any one of the same set, then the card with the numerals and spot or spots may be the next highest in the set and the last one just with the spot or spots and no numerals, the lowest card of the set.

The interplaying of the several sets is entirely a matter of values, and if it is found desirable, the single spot may be called the ace set, which naturally makes the three of the set the highest cards in the pack, barring trumps, as in many games. The lowest then is the two-spot set and from that they run up as to sets in sequence. The trump of any set takes a plain card of another set even the highest, and the tricks captured belong to a side or to an individual according to whether it is team or single players. The number of players is only limited by the number of hands that can be made up from the pack, which, of course, can be increased according to requirements, as it is only the size of the card that limits the number of spots. However, it is to be taken for granted that it will never be made cumbersome.

The count is a matter of choice. Often the number of tricks will suffice to declare a winner. Again the teacher may demand the pupils to make up sequences or combinations from the captured cards, which will tend to cause the pupils to exercise judgment in actually taking the tricks and thus materially increase the value of the game in the development of the mind.

The music cards, illustrated in Figures 10–16, are not really more difficult to handle in making up a game than the numeral cards, though the instruction is on a more advanced scale and while the methods are of the kindergarten class, it is really valuable for older pupils.

The cards can run from A to G representing the notes in music and to these may be added as fundamental cards the various signs. The additional sets are made up of A flat, B flat and so on and A sharp, B sharp and so on, the original sets representing the naturals. The signs for sharps, flats, rests, clefs and other purposes may each make up a set, so there will be a considerable number of cards in the pack, valued by arbitrary rules, such as starting with the naturals alphabetically and following with the keys by sharps and flats and then the signs.

There is more to remember in this game, but that exercises the memory and at the same time, without effort, carries the brain of the pupil into easy familiarity with the notes and their positions on the staffs as well as the signs and various keys in respect to their signatures.

The ambition in this game is or should be the capture of cards to make up the line notes of a treble staff or the space notes of the same, or their sharps or flats, or the bass notes likewise together with the staff signatures, or the notes required for a few bars of written music furnished by the teacher and given as an objective. These music cards allow great scope for both teacher and pupils.

The results of capturing cards in this game for winning purposes may be so varied that it is difficult to detail any of them, but the teacher may readily set sums or problems that can be carried out by winning the proper cards or they may be decided by sequences. It is entirely within the teacher's province to decide these matters.

The impression on the pupil's mind is all important, as for example, take the spot cards, first the child sees a card with a single spot, then another card with a single spot and the numeral 1, signifying what the spot is, then a third card with the numeral 1 without a spot, thereby finishing the impression begun by the single spot, and that the numeral 1 is the symbol for the single spot and so on throughout the various numbers of spots. The music cards and the arithmetic cards have been carefully explained and the lasting impression is herein emphasized.

Figure 13:
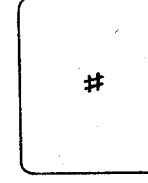
Figure 14:
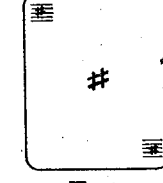
Figure 15:
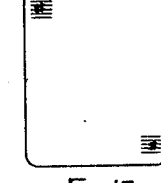
Figure 16:
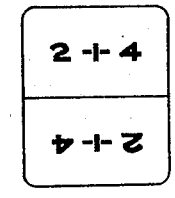
Figures 16, 17 and 18 illustrate a modification of the system in applying it to arithmetic cards.
Figure 17:
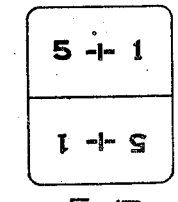
Figure 18:
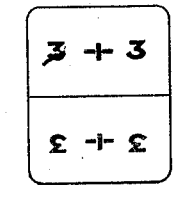

In Figures 13, 14 and 15 the arithmetic cards are played in the same manner as the other cards mentioned hereinbefore, that is to say any number of cards are used divided into a plurality of sets each of three cards, one set containing addition sums, another set subtraction sums, and another set division sums, each card of one set bringing forth the same result as each other but in a different manner, as for instance taking an addition set denoting the result of 6 the cards would be "2+4", "5+1" and "3+3" and a subtraction set could be "7—1", 9—3" and "8—2" while a divisional set could have "12÷2", "18÷3" and "6÷1".

In this way the addition cards could be the trump cards and take any other cards bringing out that number of course it will be seen that numbers of sets of additions, subtractions and divisions may be used so long as one result is included in three different sets, another result in another three and so on.

In this way it will be seen that the system will include an innumerable number of cards and as many subjects as desired.

What I claim is:

1. In an educational system of cards, a pack of cards in sets adapted to be shuffled, one card of each set showing a definition of the symbol, another showing the definition and the symbol and another showing the symbol without the definition, all adapted to be dealt out to the players and captured in competition by individual or team players and compared for results by the teacher.

2. In an educational system of cards, a pack of cards in sets adapted to be shuffled, one card of each set showing a definition of the symbol, another showing the definition and the symbol, and another showing the symbol without the definition, said cards of each set having a higher value to one another and each set having their own separate values.

3. In an educational system, a pack of cards formed in sets, each set having certain cards denoting a predetermined value in a competitive game, one card representing an object, another the object and designation, and the third the designation alone.

In testimony whereof I have affixed my signature this 27th day of May, 1924, at the city of Toronto.

HELMA KOEHLER.